United States Patent
van der Ende et al.

(10) Patent No.: US 10,927,662 B2
(45) Date of Patent: Feb. 23, 2021

(54) DOWNHOLE COMMUNICATION

(71) Applicant: Paradigm Technology Services B.V., Groot-Ammers (NL)

(72) Inventors: Andre Martin van der Ende, Udny Green (GB); Eric Atherton, Witney (GB)

(73) Assignee: PARADIGM TECHNOLOGY SERVICES B.V., Groot-Ammers (NL)

(*) Notice: Subject to any disclaimer, the term of this patent is extended or adjusted under 35 U.S.C. 154(b) by 334 days.

(21) Appl. No.: 14/369,342

(22) PCT Filed: Dec. 24, 2012

(86) PCT No.: PCT/EP2012/076880
§ 371 (c)(1),
(2) Date: Jun. 27, 2014

(87) PCT Pub. No.: WO2013/098280
PCT Pub. Date: Jul. 4, 2013

(65) Prior Publication Data
US 2015/0009041 A1    Jan. 8, 2015

(30) Foreign Application Priority Data

Dec. 28, 2011 (GB) .................................. 1122386
Feb. 12, 2012 (GB) .................................. 1202439

(51) Int. Cl.
*E21B 47/12* (2012.01)
*E21B 47/13* (2012.01)
(Continued)

(52) U.S. Cl.
CPC .............. *E21B 47/12* (2013.01); *E21B 47/13* (2020.05); *G01V 11/002* (2013.01); *H04Q 9/00* (2013.01);
(Continued)

(58) Field of Classification Search
CPC .......... G01V 11/002; G01V 1/22; G01V 1/52; G01V 3/34; E21B 47/01; E21B 17/028; H01B 7/046; G01R 1/0408; G01R 31/022
(Continued)

(56) References Cited

U.S. PATENT DOCUMENTS 4,160,970 A * 7/1979 Nicolson ............... E21B 47/122
166/66
5,189,415 A * 2/1993 Shimada ............... E21B 47/122
175/40
(Continued)

FOREIGN PATENT DOCUMENTS

EP    1214501    4/2005
WO   0120129 A2  3/2001
(Continued)

OTHER PUBLICATIONS

International Search Report, dated Jul. 11, 2013, 3 pages.
(Continued)

*Primary Examiner* — Curtis A Kuntz
*Assistant Examiner* — Jerold B Murphy
(74) *Attorney, Agent, or Firm* — William H. Honaker; Dickinson Wright PLLC

(57) ABSTRACT

A wellbore communication system (1) comprises a downhole tool (2) having a downhole transmitter (40), a sensing element (22, 122, 222, . . . , 1022) located at surface and coupled to a surface receiver (44), and an insulated slickline (6, 106, 206, . . . , 1006) having an electrically conductive core surrounded by an insulating coating. The slickline is attached to the downhole tool and coupled to the downhole transmitter. The sensing element is capacitively coupled to the slickline so as to permit movement of the slickline relative thereto and so as to an electric field to extend from the core of the slickline through the insulating coating to the
(Continued)

sensing element for transmission of information from the downhole transmitter to the surface receiver via the slickline and the sensing element.

30 Claims, 8 Drawing Sheets

(51) Int. Cl.
*G01V 11/00* (2006.01)
*H04Q 9/00* (2006.01)

(52) U.S. Cl.
CPC ..... *H04Q 2209/40* (2013.01); *H04Q 2209/84* (2013.01)

(58) Field of Classification Search
USPC ........... 340/854.3–855.2; 73/152.01–152.62; 166/250.01–263; 367/81–82
See application file for complete search history.

(56) References Cited

U.S. PATENT DOCUMENTS

| | | | | |
|---|---|---|---|---|
| 6,628,226 | B2* | 9/2003 | Suzuki | G01S 7/032 180/169 |
| 7,413,018 | B2* | 8/2008 | Hosie | E21B 33/0407 166/379 |
| 2004/0217764 | A1 | 11/2004 | Sasaoka | |
| 2006/0044156 | A1* | 3/2006 | Adnan | E21B 47/12 340/854.9 |
| 2006/0244628 | A1* | 11/2006 | Bausov | G01V 11/002 340/854.8 |
| 2009/0058675 | A1 | 3/2009 | Sugiura | |
| 2009/0078413 | A1* | 3/2009 | Tubel | E21B 47/09 166/255.1 |
| 2010/0194588 | A1* | 8/2010 | Menezes | G01V 11/002 340/854.9 |
| 2010/0258323 | A1* | 10/2010 | Varkey | E21B 33/068 166/385 |
| 2011/0164468 | A1* | 7/2011 | Robbins | E21B 47/16 367/82 |
| 2013/0124165 | A1* | 5/2013 | Rubin | G06F 17/10 703/2 |

FOREIGN PATENT DOCUMENTS

| | | | | |
|---|---|---|---|---|
| WO | WO 01/20129 | * | 3/2001 | |
| WO | WO-0120129 A2 | * | 3/2001 | ........... E21B 47/122 |
| WO | 2004063528 | | 7/2004 | |
| WO | 2009048459 A1 | | 4/2009 | |
| WO | 2009154501 A1 | | 12/2009 | |
| WO | 2010016897 A2 | | 2/2010 | |
| WO | 2011019351 A1 | | 2/2011 | |

OTHER PUBLICATIONS

Matthew Billingham, et al., Slickline Signaling a Change, Internet, Dec. 1, 2011, 10 pages.
EP Office Action for EP 12816298.9 dated Jul. 11, 2017.

\* cited by examiner

DOWNHOLE COMMUNICATION

CROSS REFERENCE TO RELATED APPLICATION

This application claims the benefit of PCT International Application Serial No. PCT/EP2012/076880 filed on Dec. 24, 2012, and entitled "Downhole Communication" which claims benefit of GB Application No. 1202439.4 filed on Feb. 12, 2012 and GB Application No. 1122386.4 filed on Dec. 28, 2011.

FIELD OF THE INVENTION

This invention relates to downhole communication and more particularly, but not exclusively, to a wellbore communication system and method.

BACKGROUND TO THE INVENTION

During light duty well service operations or logging operations, tools can be lowered into the well on various types of flexible line. Lowering tools on a flexible line is faster and less costly than lowering tools on a drill or tubing string of rigid jointed tubes, which is the alternative.

There have broadly been two types of flexible line, slickline and electric line. Slickline is a single strand of steel wire, and is used to lower mechanical tools and data logging tools (commonly known in the industry as memory tools). Electric line has a flexible multi-stranded load-bearing outer armor surrounding one or more insulated electrical conductors. Electric line is used for conveying electric line logging tools that receive electric power from the surface, and return data to the surface, over the electrical conductors.

As a cable, slickline has the great advantage of lower cost, fast running speeds, and permits a pressure seal to be formed around the line at the wellhead in a device called a stuffing box. This enables safer wireline operations in a live well compared with stranded electric line which is much more difficult to seal effectively. On the other hand, the great benefit of electric line is that it is possible to return real time data to surface over the electrical conductors. This enables the well service operation or logging operation to be more effectively and efficiently managed.

Electric line and slickline are deployed into the well from a motorised drum that stores the cable and also acts as a winch, lowering or raising the tools in the well by rotating the drum and hence spooling more or less cable from the drum. In the case of electric line, as the surface instrumentation is typically not located in the drum, special rotatable electrical contacts are required between the rotating drum and the surface electrical equipment that is not rotating. These rotatable contacts are known as "slip rings", and are a potential source of unreliability.

An apparatus and method is disclosed in EP 1,214,501 whereby the advantages of both electric line and slickline are achieved in a new type of wireline cable, now known as the coated slickline, or insulated slickline. The coated slickline is a conventional steel slickline coated with a thin, hard, durable, non-conductive and flexible coating. This maintains the highly desirable lower cost, higher running speeds and pressure sealing ability of the conventional slickline, while providing the potential for data transmission to surface. As the coated slickline acts as an antenna and the signals from the downhole transmitter are received directly from the coated slickline as it emerges from the wellhead, there is no need to make any sort of electrical contact with the slickline at the surface, hence there is no need for modification of the slickline unit to contain slip rings in the cable drum. While the invention disclosed in EP 1,214,501 has the great advantage of avoiding the need for slip rings, the transmission method used is not able to communicate consistently over a wide range of well depths and/or through a wide range of well fluids.

An alternative system disclosed in WO 2004/063528 relies on a surface control unit that is electrically connected both to the slickline and the wellhead. This system requires slip rings to enable an electrical connection to be made from the static surface control unit to the end of the slickline which is contained within the rotating cable drum. Although slip rings are fitted as standard on electric line logging units, they are not fitted on slickline units. This requires a special modification to the slickline unit before the downhole communications system disclosed in WO 2004/063528 can be used.

SUMMARY OF THE INVENTION

According to a first aspect of the present invention, there is provided a wellbore communication system, the system comprising a downhole tool comprising a downhole transmitter coupled to an insulated slickline capable of simultaneously running the downhole tool into the wellbore and conveying a signal from the transmitter to surface, the system further comprising a sensing element at surface, wherein the insulated slickline passes through the sensing element and the sensing element senses a signal from the downhole transmitter.

Such a wellbore communication system may have a greater depth capability and/or may permit communication over a broader range of borehole fluid types than previous wellbore communication systems, while maintaining the capability to sense a downhole signal from moving insulated slickline without making electrical contact with it and hence avoiding the need to modify the slickline cable drum to incorporate slip ring assemblies.

The downhole tool, transmitter, slickline and sensing element may be of any suitable form and construction.

The system may be configured so that the insulated slickline may pass freely through the sensing element.

The insulated slickline may comprise an electrically conductive core and an electrically insulating coating.

The system may be configured so that the insulating coating of the insulated slickline is spaced apart from the sensing element.

The system may be configured so that the insulating coating of the insulated slickline engages the sensing element.

The system may be configured so that there is no electrical contact with the core of the insulated slickline at a surface end of the insulated slickline.

The system may be configured so that the sensing element senses an electromagnetic field generated by the signal conveyed by the insulated slickline.

The system may be configured so that the sensing element senses an electric field generated by the signal conveyed by the insulated slickline.

The sensing element may be located within the flow tubes of a stuffing box.

The sensing element may be attached to the outside of a wellhead or to a stuffing box.

The sensing element may be attached to, or form part of, a line spooling arm.

The sensing element may be located along an axis of a slickline drum.

The sensing element may by located at least partially within an axle of a slickline drum.

The sensing element may comprise a tube.

The sensing element may, for example, comprise a metal tube.

The sensing element may be configured to be temporarily split to allow the insulated slickline to be inserted into the sensing element. For example, the sensing element may comprise two parts which are separable to permit insertion of the insulated slickline therebetween. The two parts of the sensing element may be subsequently joined so that the insulated slickline extends through the sensing element.

The sensing element may be connected to a surface receiver.

The surface receiver may be configured to receive the signal conveyed by the slickline from the downhole transmitter.

The system may be configured to amplify the signal conveyed by the slickline from the downhole transmitter. The system may comprise a surface receiver amplifier for this purpose.

The system may be configured to filter and/or decode the signal conveyed by the slickline from the downhole transmitter. The system may comprise a surface processor for this purpose.

The wellbore communications system may comprise a surface transmitter and a downhole receiver. Such a wellbore communications system may be used for bidirectional communications.

The downhole transmitter and the downhole receiver may form part of a downhole transceiver.

The surface receiver and the surface transmitter may form part of a surface transceiver.

The downhole transceiver may be battery powered.

The downhole transceiver may be connected to one or more of: a) a string of wireline production logging tools; b) a wireline conveyed perforating gun system; c) a casing collar locator; d) a natural gamma ray depth correlation tool; e) a motorised wireline calliper tool; f) motorised wireline centralisers; g) any other well known electric wireline or conventional slickline tools; and h) motorised downhole toolstring tractors. One or more of a) to h) may be battery powered.

The surface transceiver and the downhole transceiver may actively maintain a match between their respective communication frequencies in the face of dramatically different operating conditions, in particular embodiments, ambient temperatures.

The downhole transceiver communication frequency may be allowed to drift with temperature, and the surface transceiver may continuously measure the communication frequency of the downhole transceiver and match its own communication frequency to the downhole communication frequency.

The wellbore communications system may comprise an electrically conductive tubing string extending from surface downhole. The tubing string may, for example, form part of the infrastructure associated with the wellbore. The tubing string may comprise at least one of a liner string, casing string, production tubing and the like.

The system may comprise an enclosure for the downhole transceiver.

The downhole transceiver enclosure may be capacitively coupled with the tubing string. For example, the downhole transceiver enclosure may be capacitively coupled with the tubing string via a centraliser. This may result in a variable capacitance between the downhole transceiver enclosure and the tubing string.

The downhole transceiver may comprise a downhole capacitor connected between a negative, common or ground node of the downhole transceiver and the downhole transceiver enclosure.

The downhole capacitor may be connected in series with the variable capacitance between the downhole transceiver enclosure and the tubing string. This may reduce the variation in the total capacitance between the negative, common or ground node of the downhole transceiver and the tubing string. This may result in a reduced dynamic range of a received signal at the downhole transceiver. This may reduce a dynamic range requirement for a receiver amplifier of the downhole transceiver. This may allow the use of downhole receiver amplifier circuitry which is simpler, which consumes less power and/or which is less expensive.

The downhole capacitor may be selected to have a value comparable to a minimum value of the variable capacitance between the downhole transceiver enclosure and the tubing. This may result in a total capacitance between the negative, common or ground node of the downhole transceiver and the tubing which lies in an approximate range between 0.5 and 1 times the minimum value of the variable capacitance between the downhole transceiver enclosure and the tubing.

The system may comprise an enclosure for the surface transceiver.

The surface transceiver enclosure may be capacitively coupled with the tubing string. For example, the surface transceiver enclosure may be capacitively coupled with the tubing string. This may result in a variable capacitance between the surface transceiver enclosure and the tubing string.

The surface transceiver may comprise a surface capacitor connected between a negative, common or ground node of the surface transceiver and the surface transceiver enclosure.

The surface capacitor may be connected in series with the variable capacitance between the surface transceiver enclosure and the tubing string. This may reduce the variation in the total capacitance between the negative, common or ground node of the surface transceiver and the tubing string. This may result in a reduced dynamic range of a received signal at the surface transceiver. This may reduce a dynamic range requirement for a receiver amplifier of the surface transceiver. This may allow the use of surface receiver amplifier circuitry which is simpler, which consumes less power and/or which is less expensive.

The surface capacitor may be selected to have a value comparable to a minimum value of the variable capacitance between the surface transceiver enclosure and the tubing. This may result in a total capacitance between the negative, common or ground node of the surface transceiver and the tubing which lies in an approximate range between 0.5 and 1 times the minimum value of the variable capacitance between the surface transceiver enclosure and the tubing.

According to a second aspect of the present invention, there is provided a wellbore communication system comprising a downhole tool having a downhole transmitter, a sensing element at surface and an insulated slickline which is attached to the downhole tool and coupled to the downhole transmitter, wherein the insulated slickline extends from the downhole transmitter and through the sensing element so as to permit transmission of information from the downhole transmitter to the sensing element.

It should be understood that one or more of the optional features described in relation to the first aspect may apply alone or in any combination in relation to the second aspect.

According to a third aspect of the present invention, there is provided a wellbore communication system comprising a downhole tool having a downhole transmitter, a sensing element at surface, and an insulated slickline which is attached to the downhole tool, coupled to the downhole transmitter and which extends from the downhole transmitter to the sensing element, wherein the slickline and the sensing element are capacitively coupled so as to permit transmission of information from the downhole transmitter along the slickline to the sensing element.

The system may comprise a surface receiver, wherein the surface receiver is coupled to the sensing element.

The slickline and the sensing element may be capacitively coupled so as to permit relative movement therebetween.

The slickline may have a conductive core surrounded by an insulating coating.

The slickline and the sensing element may be capacitively coupled so as to permit an electric field to extend from the core of the slickline to the sensing element through the insulating coating of the slickline.

Such a system may be used to transmit of information from the downhole transmitter to the surface receiver via the slickline and the sensing element.

Such a system may provide an enhancement in coupling efficiency between the slickline and the sensing element compared with known systems which rely on radiation of an electromagnetic signal between a slickline and a surface antenna across a gap which is greater than the extent of an electric field extending from the slickline. Such an enhancement in coupling efficiency may provide an enhancement in communication bandwidth and/or permit communication between a downhole transmitter and a surface receiver along longer lengths of slickline. The system may be configured so that an electromagnetic signal in the slickline generates an electromagnetic signal in the sensing element or vice versa.

The system may be configured so that an electrical signal in the slickline generates an electrical signal in the sensing element or vice versa.

The system may be configured so that a voltage signal in the slickline generates a voltage signal in the sensing element or vice versa.

The system may be configured so as to provide a predetermined relationship between an electrical signal in the slickline and an electrical signal in the sensing element. For example, the electrical signal in the sensing element may be associated with, related to, representative of, and/or proportional to the electrical signal in the slickline or vice versa.

The downhole transmitter may comprise electronic circuitry.

The downhole transmitter may employ frequency shift key (FSK) signalling using a sinusoidal or square wave carrier frequency in the range 2 kHz to 15 kHz.

The downhole transmitter may employ an encoding scheme such as Manchester Data encoding as a modulation scheme.

The sensing element may be directly or indirectly coupled to the surface receiver.

The surface receiver may comprise electronic circuitry.

The surface receiver may be configured to receive an electrical signal, for example a voltage signal, from the sensing element.

The surface receiver may be configured to detect an electrical signal, for example a voltage signal, received from the sensing element.

The surface receiver may be configured to amplify an electrical signal, for example, a voltage signal received from the sensing element.

The surface receiver may have a high input impedance.

The surface receiver may be configured for communication with a user interface such as a graphical user interface, data input means, a control panel and/or the like. The surface receiver may be configured for wireless or wireline communication with a user interface. The surface receiver may be configured for communication with a user interface which is located adjacent to the surface receiver at a wellhead or which is located remotely from the surface receiver.

The surface receiver may be configured for communication with a data store. The data store may be located proximate to the surface receiver at a wellhead or may be located remotely from the surface receiver.

The sensing element may be separated from the insulating coating of the slickline by a gap which is smaller than an extent of an electric field generated by a signal conveyed along the insulated slickline. This may avoid the need for physical contact with the slickline whilst permitting capacitive coupling of an electrical signal between the electrical conductor of the slickline and the sensing element. This may reduce or eliminate wear and/or damage caused by friction effects between the electrical conductor of the slickline and the sensing element which may otherwise occur during relative movement therebetween. In addition, such a system may not be subject to the same degree of signal degradation due to build-up of dirt, particulates foreign matter, hydrates or the like that may occur with known slickline coupling arrangements which require physical contact with an electrical conductor of a slickline.

The sensing element may engage the insulating coating of the slickline. Such an arrangement may ensure that the sensing element is in close proximity to the core of the slickline for enhanced capacitive coupling of the electric field between the slickline and the sensing element.

The sensing element may be elongated.

The sensing element may extend in a direction along which the slickline extends. Such an arrangement may increase a spatial extent of coupling of the electric field between the slickline and the sensing element and, therefore, enhance the degree of coupling of the electric field between the slickline and the sensing element.

The sensing element may partially surround the slickline.

The sensing element may have a discontinuous cross-section in a plane lateral to the slickline.

The sensing element may be split longitudinally along a direction of the slickline.

The sensing element may define a generally concave surface profile.

The sensing element may define a surface profile which is substantially complementary to an outer surface of the insulating slickline. Such a surface profile may increase a spatial extent of coupling of the electric field between the slickline and the sensing element and, therefore, enhance the degree of coupling of the electric field between the slickline and the sensing element.

The sensing element may define a U-shaped surface profile. Such a profile may permit the sensing element to be moved into a position adjacent the slickline or into engagement with the slickline. Such a surface profile may increase a spatial extent of coupling of the electric field between the slickline and the sensing element and, therefore, enhance the degree of coupling of the electric field between the slickline and the sensing element.

The sensing element may define a channel along which the slickline extends.

The slickline may extend through the sensing element. Such an arrangement may increase a spatial extent of coupling of the electric field between the slickline and the sensing element and, therefore, enhance the degree of coupling of the electric field between the slickline and the sensing element.

The sensing element may define an aperture through which the slickline extends.

The sensing element may define a channel through which the slickline extends.

The sensing element may be tubular.

The sensing element may define an elongated channel. Such an arrangement may increase a spatial extent of coupling of the electric field between the slickline and the sensing element and, therefore, enhance the degree of coupling of the electric field between the slickline and the sensing element.

The sensing element may comprise an elongated tube.

The sensing element may define a channel of a length which is greater than a diameter of the slickline.

The sensing element may define a channel of a length which is at least twice the diameter of the slickline, at least five times greater than the diameter of the slickline, at least ten times greater than the diameter of the slickline or at least one hundred times greater than the diameter of the slickline.

The sensing element may comprise an electric field sensor.

The slickline and the sensing element may be inductively coupled.

The sensing element may comprise at least one of a loop, a ring, a coil and the like or a portion thereof.

The sensing element may comprise a ferritic material.

The sensing element may comprise a magnetic field sensor such as a Hall-effect sensor or the like.

The system may comprise a wellhead member or a stuffing box, wherein the sensing element is attached to the outside of the wellhead member or the stuffing box.

The system may comprise a housing mounted on the stuffing box. The sensing element may be housed within the housing.

The system may comprise a toroid positioned around the slickline.

The use of a toroid positioned around the slickline may serve to reduce electrical noise received at the surface receiver.

The system may comprise one or more ferrite rings positioned around the slickline. The use of one or more ferrite rings positioned around the slickline may serve to reduce electrical noise received at the surface receiver.

The system may comprise first and second toroids positioned adjacent to one another around the slickline.

The first toroid may be used to sense electrical noise carried by the conductive core of the slickline.

The first toroid may be used to sense 50 Hz electrical noise carried by the conductive core of the slickline.

The second toroid may be used to apply an electrical signal to the conductive core of the slickline for cancellation of the electrical noise.

The first toroid may be used to sense 50 Hz electrical noise carried by the conductive core of the slickline.

The second toroid may be used to apply a 50 Hz electrical signal to the conductive core of the slickline for cancellation of the 50 Hz electrical noise. The toroid and/or the ferrite ring may be positioned between the sensing element and an upper end of the slickline.

The sensing element may be located within flow tubes of the stuffing box.

The system may be configured to urge the slickline towards the sensing element.

The system may be configured to urge the slickline into engagement with the sensing element. For example, the system may comprise a spring arrangement, one or more pressure wheels, rollers or the like.

The sensing element may comprise a sheave wheel, guide wheel or the like.

The system may be configured so that the slickline engages the sheave wheel.

The system may be configured so that the sheave wheel rotates to accommodate movement of the slickline relative to the sheave wheel.

The system may be configured so that the sheave wheel rotates in response to movement of the slickline relative to the sheave wheel.

The use of a sheave wheel as a sensing element would serve to eliminate or at least substantially reduce friction between the slickline and the sensing element compared with a stationary sensing element. This would result in reduced wear of the slickline and/or the sensing element compared with the case of a stationary sensing element. Moreover, such a sensing element would eliminate any requirement to have a separate sheave and a separate sensing element thus providing a more compact wellhead arrangement compared to a wellhead arrangement having a separate sheave and a separate sensing element.

The system may be configured so that the slickline engages a portion of an outer surface of the sheave wheel. Such an arrangement may increase a spatial extent of coupling of the electric field between the slickline and the sensing element and, therefore, enhance the degree of coupling of the electric field between the slickline and the sensing element.

The system may be configured so that the slickline extends around an outer surface of the sheave wheel.

The system may be configured so that the slickline is wrapped around an outer surface of the sheave wheel.

The system may be configured so that the slickline is looped around the sheave wheel.

The system may be configured so that the slickline is looped around the sheave wheel once.

The system may be configured so that the slickline is looped around the sheave wheel more than once. Such an arrangement may increase a spatial extent of coupling of the electric field between the slickline and the sensing element and, therefore, enhance the degree of coupling of the electric field between the slickline and the sensing element.

The sheave wheel may define a channel in an outer surface thereof, wherein the channel is configured to accommodate or receive the slickline. Such an arrangement may increase a spatial extent of coupling of the electric field between the slickline and the sensing element and, therefore, enhance the degree of coupling of the electric field between the slickline and the sensing element.

The channel may define a generally concave surface profile.

The channel may define a surface profile which is substantially complementary to an outer surface of the insulating slickline.

The channel may define a U-shaped surface profile.

The sheave wheel may be partially, substantially or wholly electrically conductive.

The system may comprise a support structure, wherein the sheave wheel is rotatable relative to the support structure.

The sheave wheel may be attached to or integrally formed with an axle or a shaft or the like which is rotatable relative to the support structure.

The support structure may comprise a bearing configured to permit rotation of the sheave wheel relative to the support structure.

The system may comprise an electrical connection arrangement which provides an electrical connection between the sheave wheel and a surface receiver.

The system may comprise an electrical connection arrangement which provides an electrical connection between a surface receiver and an axle which is rotatable with the sheave wheel.

The system may comprise may comprise a slip ring which provides an electrical connection between a surface receiver and an axle which is rotatable with the sheave wheel.

The slip ring may be configured for low-noise performance.

The slip ring may be a mercury-wetted slip ring.

The sheave wheel may comprise a metal.

The sheave wheel may comprise a wear-resistant outer surface region and/or a wear-resistant outer coating.

The sensing element may be partially, substantially or wholly electrically conductive.

The sensing element may comprise a metal.

The sensing element may comprise a semiconductor material.

The sensing element may comprise a wear-resistant outer surface region and/or a wear-resistant coating.

The system may comprise electrically conductive tubing inserted into a bore hole. For example, the system may comprise an electrically conductive tubing string, casing string, liner string, production tubing or the like inserted into the bore hole.

The downhole transmitter and the tubing may be electrically coupled.

The downhole transmitter and the tubing may be directly electrically coupled. For example, the downhole transmitter and the tubing may be in engagement.

The downhole transmitter and the tubing may be indirectly coupled.

The downhole transmitter and the tubing may be reactively coupled.

The downhole transmitter and the tubing may be capacitively coupled.

The downhole transmitter and the tubing may be inductively coupled.

The downhole transmitter and the tubing may be remotely coupled by the radiation of an electromagnetic signal therebetween.

The downhole transmitter and the tubing may be coupled via one or more stabiliser and/or centraliser elements.

The system may comprise a surface enclosure for housing the surface receiver.

The surface enclosure may be capacitively coupled with the tubing. This may result in a variable capacitance between the surface enclosure and the tubing.

The system may comprise a surface capacitor connected between a negative, common or ground node of the surface receiver and the surface enclosure.

The surface capacitor may be connected in series with the variable capacitance between the surface enclosure and the tubing. This may reduce the variation in the total capacitance between the negative, common or ground node of the surface receiver and the tubing. This may result in a reduced dynamic range of a received signal at the surface receiver. This may reduce a dynamic range requirement for a receiver amplifier associated with the surface receiver. This may allow the use of surface receiver amplifier circuitry which is simpler, which consumes less power and/or which is less expensive.

The surface capacitor may be selected to have a value comparable to a minimum value of the variable capacitance between the surface enclosure and the tubing. This may result in a total capacitance between the negative, common or ground node of the surface receiver and the tubing which lies in an approximate range between 0.5 and 1 times the minimum value of the variable capacitance between the surface enclosure and the tubing.

The system may be configured for two-way communication. For example, the system may comprise a downhole receiver and a surface transmitter. The surface transmitter may be coupled to the sensing element. The downhole transmitter and the downhole receiver may form part of a downhole transceiver. The surface transmitter and the surface receiver may form part of a surface transceiver.

The surface transmitter may employ frequency shift key (FSK) signalling using a sinusoidal or square wave carrier frequency in the range 2 kHz to 15 kHz.

The surface transmitter may employ an encoding scheme such as Manchester Data encoding as a modulation scheme.

The slickline and the sensing element may be capacitively coupled so as to permit transmission of information from the surface transmitter to the downhole receiver via the sensing element.

The system may comprise a downhole enclosure for housing the downhole receiver.

The downhole enclosure may be capacitively coupled with the tubing. For example, the downhole enclosure may be capacitively coupled with the tubing via a centraliser. This may result in a variable capacitance between the downhole enclosure and the tubing.

The system may comprise a downhole capacitor connected between a negative, common or ground node of the downhole receiver and the downhole enclosure.

The downhole capacitor may be connected in series with the variable capacitance between the downhole enclosure and the tubing. This may reduce the variation in the total capacitance between the negative, common or ground node of the downhole receiver and the tubing. This may result in a reduced dynamic range of a received signal at the downhole receiver. This may reduce a dynamic range requirement for a receiver amplifier associated with the downhole receiver. This may allow the use of downhole receiver amplifier circuitry which is simpler, which consumes less power and/or which is less expensive.

The downhole capacitor may be selected to have a value comparable to a minimum value of the variable capacitance between the downhole enclosure and the tubing. This may result in a total capacitance between the negative, common or ground node of the downhole receiver and the tubing which lies in an approximate range between 0.5 and 1 times the minimum value of the variable capacitance between the downhole enclosure and the tubing.

The system may comprise an electrical return path. The return path may extend through the tubing. Such a return path may reduce attenuation or degradation of an electrical signal as the electrical signal propagates along the slickline and may, therefore, provide greater signal strength and/or improve the quality of a signal received by the surface receiver. This may provide for downhole communication over a greater distance and/or at a greater speed.

The sensing element may be located at or adjacent to a top of the tubing. Such an arrangement may ensure that an electrical signal transmitted along the slickline between the downhole transmitter and the surface receiver does not degrade or diminish to such an extent that the electrical signal is undetectable at its destination. This is because the slickline and the tubing may act in combination as a transmission line or waveguide for the electrical signal to reduce attenuation of the signal and, if the sensing element is located too remotely from the top of the tubing, this may result in excessive attenuation of the electrical signal between the top of the tubing and the sensing element thereby rendering the electrical signal undetectable at the surface receiver.

The system may comprise a return conductor.

The return path may extend through the return conductor.

The return conductor may be electrically connected between the surface receiver enclosure and the tubing.

The return conductor may be electrically connected between the surface receiver enclosure and the tubing at a position at or adjacent to the top end of the tubing.

The return conductor may, for example, comprise an electrically conductive element, member, cable, wire or the like.

The return conductor may comprise a grounding cable.

The sensing element may be attached to, or form part of, a line spooling arm associated with a slickline drum for spooling the slickline.

The system may comprise a slickline drum for spooling the slickline.

The system may comprise a motor for driving the slickline drum.

The system may comprise a support structure, wherein the slickline drum is rotatable relative to the support structure.

The support structure may comprise a bearing configured to permit rotation of the slickline drum relative to the support structure.

The sensing element may be located on an axis of rotation of the slickline drum.

The slickline drum may be attached to or integrally formed with an axle which is rotatable relative to the support structure.

The axle may be hollow.

The axle may receive or accommodate the sensing element.

An upper end of the slickline may extend adjacent to the sensing element.

An upper end of the slickline may extend at least partially into or through the sensing element. The sensing element may be static relative to the axle. Thus, the upper end of the slickline may rotate inside the sensing element without unduly affecting the capacitive coupling between the slickline and the sensing element.

The axle may receive or accommodate the sensing element within a portion of the axle which extends between flanges of the slickline drum.

The axle may receive or accommodate the sensing element within a portion of the axle which extends to one side of the slickline drum.

The insulated slickline may comprise an enamel coating. For example, the insulated slickline may comprise a coating comprising polyester, polyamide, polyamide-imide, polycarbonates, polysulfones, polyester imides, polyether ether ketone, polyurethane, nylon, epoxy, equilibrating resin, alkyd resin, theic polyester, or the like or any combination thereof.

The slickline may comprise a single strand steel or alloy wire.

The slickline may have a diameter of up to 6.25 mm or a diameter of around 2.34 mm to 3.17 mm.

It should be understood that one or more of the optional features described in relation to the first or second aspect may apply alone or in any combination in relation to the third aspect.

According to a fourth aspect of the present invention, there is provided a wellbore communication method comprising:

capacitively coupling a sensing element and an insulated slickline at a surface location;

running a downhole tool attached to the insulated slickline into a wellbore using the slickline, wherein the downhole tool has a downhole transmitter and the slickline is coupled to the downhole transmitter; and transmitting information from the downhole transmitter along the slickline to the sensing element.

The steps of capacitively coupling the sensing element and the insulated slickline and running the downhole tool attached to the insulated slickline into the wellbore using the insulated slickline may at least partially overlap.

The steps of capacitively coupling the sensing element and the insulated slickline and running the downhole tool attached to the insulated slickline into the wellbore using the insulated slickline may be performed in any order.

The method may comprise transmitting information from the downhole transmitter to a surface receiver which is coupled to the sensing element via the slickline and the sensing element.

The method may comprise capacitively coupling the slickline and the sensing element so as to permit relative movement therebetween.

The slickline may have a conductive core surrounded by an insulating coating.

The method may comprise capacitively coupling the slickline and the sensing element so as to permit an electric field to extend from the core of the slickline to the sensing element.

The method may comprise transmitting an electrical signal along the slickline so as to generate a electrical signal in the sensing element.

The method may comprise transmitting a voltage signal along the slickline so as to generate a voltage signal in the sensing element.

The method may comprise receiving an electrical signal, for example a voltage signal, from the sensing element at a surface receiver.

The method may comprise detecting an electrical signal, for example, a voltage signal from the sensing element at a surface receiver.

The method may comprise amplifying an electrical signal, for example, a voltage signal from the sensing element at a surface receiver.

The method may comprise transmitting a frequency shift key (FSK) modulated sinusoidal or square wave carrier frequency in the range 2 kHz to 15 kHz along the slickline.

The method may comprise employing an encoding scheme such as Manchester Data encoding as a modulation scheme.

The method may comprise:

coupling a surface transmitter to the sensing element;

coupling a downhole receiver to the insulated slickline; and transmitting information from the surface transmitter to the downhole receiver via the sensing element and the slickline.

The method may comprise:

determining a frequency of data received by the surface receiver from the downhole transmitter; and transmitting data from the surface transmitter to the downhole receiver at the determined data frequency.

It should be understood that one or more of the optional features described in relation to the first, second or third aspect may apply alone or in any combination in relation to the fourth aspect.

According to a fifth aspect of the present invention, there is provided a wellbore communication system comprising a downhole tool having a downhole transmitter, a sheave at surface, and an insulated slickline which is attached to the downhole tool, coupled to the downhole transmitter and which extends from the downhole transmitter round the sheave so as to permit the transmission of information from the downhole transmitter along the slickline to the sheave.

The slickline and the sheave may be capacitively coupled.

The slickline may have a conductive core surrounded by an insulating coating.

The slickline and the sheave may be capacitively coupled so as to permit an electric field to extend from the core of the slickline to the sheave.

It should be understood that one or more of the optional features described in relation to any of the first to fourth aspects may apply alone or in any combination in relation to the fifth aspect.

According to a sixth aspect of the present invention, there is provided a wellbore communication method comprising:

providing a downhole tool having a downhole transmitter, a sheave at surface, and an insulated slickline which is attached to the downhole tool, coupled to the downhole transmitter and which extends from the downhole transmitter round the sheave;

running the downhole tool into a wellbore using the slickline; and transmitting information from the downhole transmitter along the slickline to the sheave.

The method may comprise capacitively coupling the slickline and the sheave.

The slickline may have a conductive core surrounded by an insulating coating.

The method may comprise capacitively coupling the slickline and the sheave so as to permit an electric field to extend from the core of the slickline to the sheave.

The method may comprise transmitting an electrical signal along the slickline so as to generate an electrical signal in the sheave.

The method may comprise transmitting a voltage signal along the slickline so as to generate a voltage signal in the sheave.

The method may comprise receiving an electrical signal, for example, a voltage signal from the sheave at a surface receiver.

The method may comprise detecting an electrical signal, for example, a voltage signal from the sheave at a surface receiver.

The method may comprise amplifying an electrical signal, for example, a voltage signal from the sheave at a surface receiver.

It should be understood that one or more of the optional features described in relation to any of the first to fifth aspects may apply alone or in any combination in relation to the sixth aspect.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
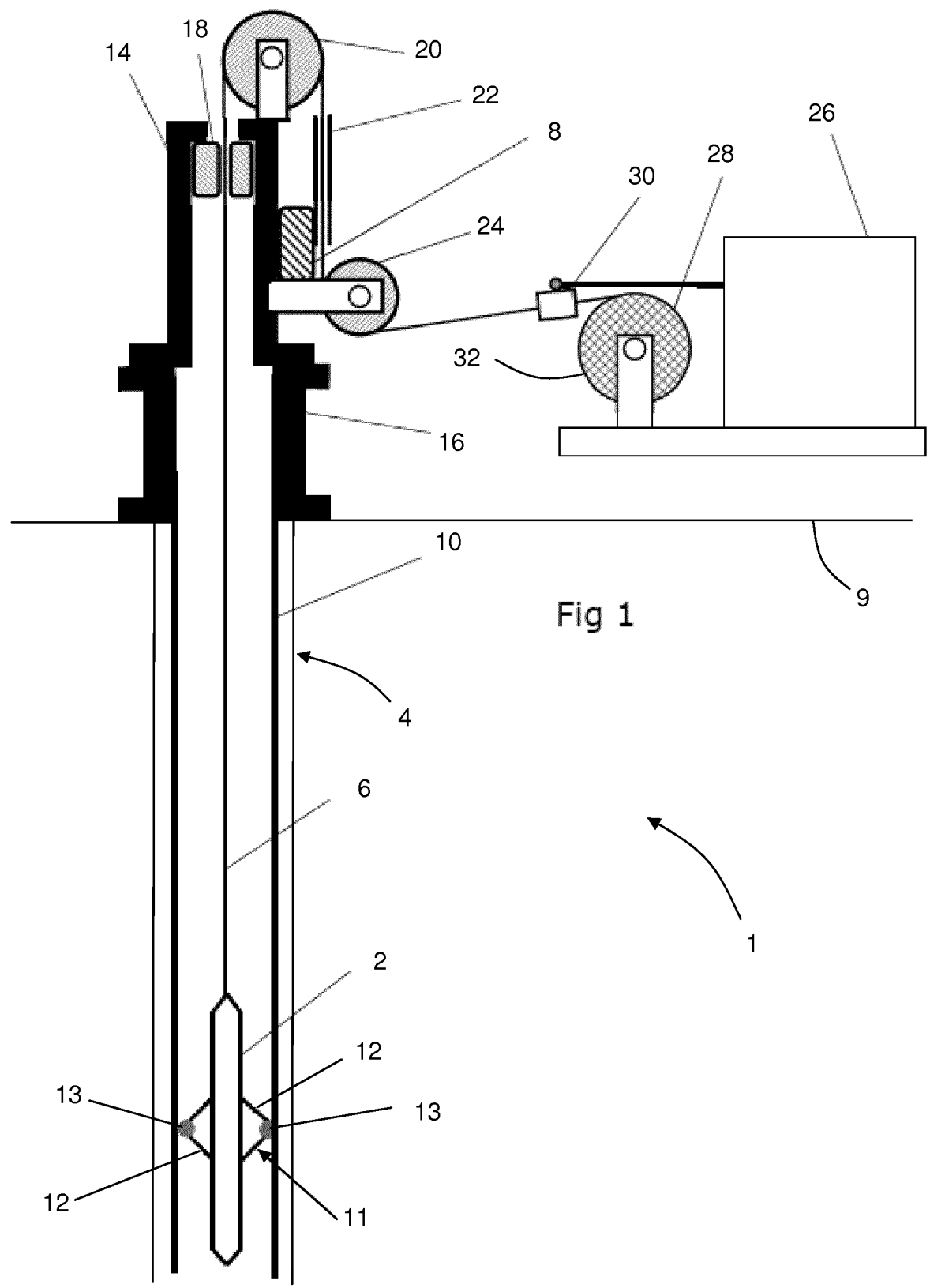
FIG. 1 shows a first wellbore communication system.

Referring initially to FIG. 1 there is shown a first wellbore communication system generally designated 1 comprising a downhole tool 2 located within a wellbore 4, an insulated slickline 6 and a surface transceiver (not shown in FIG. 1) located within a surface transceiver enclosure 8 above or adjacent a surface 9. It should be understood that the insulated slickline 6 comprises an electrically conductive core and an electrically insulating coating (not shown explicitly in FIG. 1). Also, although not shown in FIG. 1, the downhole tool 2 includes a downhole transceiver to be described in more detail below. It should be understood that a point of entry of the wellbore 4 is located at the surface 9 and that the surface 9 may represent a ground or seabed surface or a surface of a platform or the like mounted above a ground or seabed surface.

As will be described in more detail below, the insulated slickline 6 is mechanically coupled to the downhole tool 2. In use, the slickline 6 may be used to run the downhole tool 2 into and out of the wellbore 4. The insulated slickline 6 is also electrically coupled to the downhole transceiver within the downhole tool 2. The wellbore communication system 1 further comprises an elongated tubular sensing element 22 which is capacitively coupled to the slickline 6 so that, in use, an electrical field extends between the sensing element 22 and the conductive core of the slickline 6 for the transfer of a voltage signal therebetween. The elongation of the sensing element 22 provides a greater effective surface area for enhanced capacitive coupling between the sensing element 22 and the slickline 6. The sensing element 22 extends around the slickline 6 whilst allowing the slickline 6 to run freely therethrough. The tubular sensing element 22 is constructed in two halves which are configured for assembly to form the tubular sensing element 22 around the insulated slickline 6. In use, the insulated slickline 2 conveys signals between the downhole transceiver within the downhole tool 2 and the surface transceiver within the surface transceiver enclosure 8 via the sensing element 22.

As will be described in more detail below, an electrically conductive tubing string in the form of an electrically conductive casing string 10 is installed within the wellbore 4. The wellbore communication system 1 comprises a centraliser 11 for centralising the downhole tool 2 within the casing string 10 similar to well known electric line centralisers. The centraliser 11 comprises electrically conductive arms 12 and a contact head 13 at a distal end of each arm 12 for engaging the casing string 10.

A stuffing box 14 is mounted on a wellhead member 16 located at or adjacent surface 9. The stuffing box 14 comprises flow tubes 18 which fit closely around the insulated slickline 6 and serve to form a pressure seal to prevent the escape of well fluids from the wellbore 4. The stuffing box 14, and the wellhead member 16 are electrically conductive. The surface transceiver enclosure 8 is mounted on the stuffing box 14. The sensing element 22 is mounted on the surface transceiver enclosure 8 but is electrically insulated therefrom.

The insulated slickline 6 runs over an upper sheave wheel 20 and then through the sensing element 22 before running round a lower sheave wheel 24 on the way to a slickline unit generally designated 26. The slickline unit 26 includes a motor driven cable drum 28 for spooling the insulated slickline cable 6 and hence raise and lower the downhole tool 2 within the wellbore 4. The slickline unit 26 also includes a steerable arm 30 for controlling spooling of the slickline 6 onto the drum 28. An upper end of the slickline 6 is fitted with an insulating cover (not shown) and located inside the drum 28. The slickline unit 26 may be a standard slickline unit, as used with conventional uncoated slickline, as no arrangements are required for an electrical connection to the insulated slickline 6. The drum 28 comprises drum flanges 32 having nylon protection plates mounted thereon for mechanical protection of the insulating coating of the insulated slickline 6.

Figure 2:
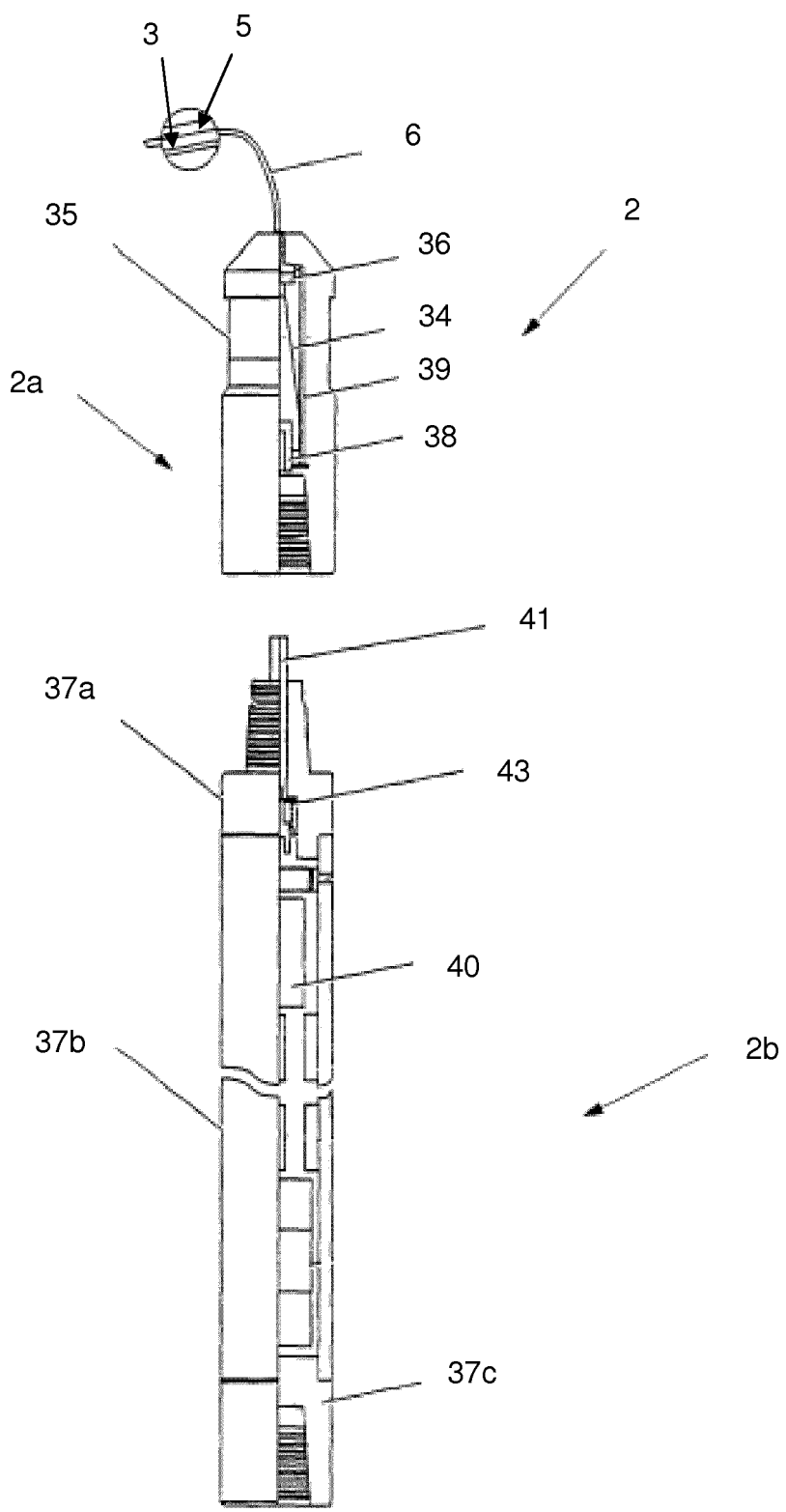
FIG. 2 is a part cross-section of a downhole tool of the first wellbore communication system of FIG. 1.

As shown in FIG. 2, the slickline 6 is coupled at a lower end thereof to a part of the downhole tool 2 commonly known as a rope-socket 2a. The main function of the rope-socket 2a is to provide a mechanical linkage between the slickline 6 and the downhole tool 2. The mechanical linkage may be any one of a plurality of different forms, but is typically a self-tightening means. In FIG. 2, the rope-socket 2a includes a wedge or wire retaining cone 34 which engages in a correspondingly tapered retaining sleeve 35. The rope-socket 2a comprises a seal or gasket 36 which seals around the slickline 6 to isolate the rope-socket 2a from the well environment around the slickline 6. The rope-socket 2a also provides an electrical coupling between the slickline 6 and the downhole tool 2.

The main portion 2b of the downhole tool 2 typically comprises an upper sub 37a, an intermediate sub 37b, and a lower sub 37c. Each of the upper, intermediate and lower subs 37a, 37b, and 37c is coupled to the adjacent sub by a threaded connection. It should be understood that the centraliser 11 is not shown in FIG. 2.

The upper sub 37a comprises a screw thread, typically in the form of a pin, which engages with a corresponding internal screw thread, typically in the form of a box, on the rope-socket 2a. These threaded connections allow the rope-socket 2a and main portion 2b of the downhole tool 2 to be mechanically coupled together. The upper sub 37a further comprises a downhole transceiver 40 for communicating with a surface transceiver (not shown in FIG. 2) via the slickline 6.

The rope-socket 2a comprises an electrical terminal 38 which couples the electrically conductive core 3 of the slickline 6 and the downhole transceiver 40. The electrical terminal 38 is electrically isolated from the body of the rope-socket 2a using an insulating sleeve 39.

The upper sub 37a of the main portion 2b of the downhole tool 2 comprises an electrical pin or contact plunger 41 which is spring-loaded so that it can move longitudinally with respect to a longitudinal axis of the downhole tool 2. A lower end of the contact plunger 41 is in contact with a main contactor 43 which is electrically coupled to the downhole transceiver 40. When the rope-socket 2a and the main portion 2b of the downhole tool 2 are screw coupled, the contact plunger 41 engages the electrical terminal 38 within the rope-socket 2a to facilitate communication between the downhole transceiver 40 and a surface transceiver (not shown in FIG. 2) through the plunger 41, the terminal 38 and the slickline 6.

Figure 3:
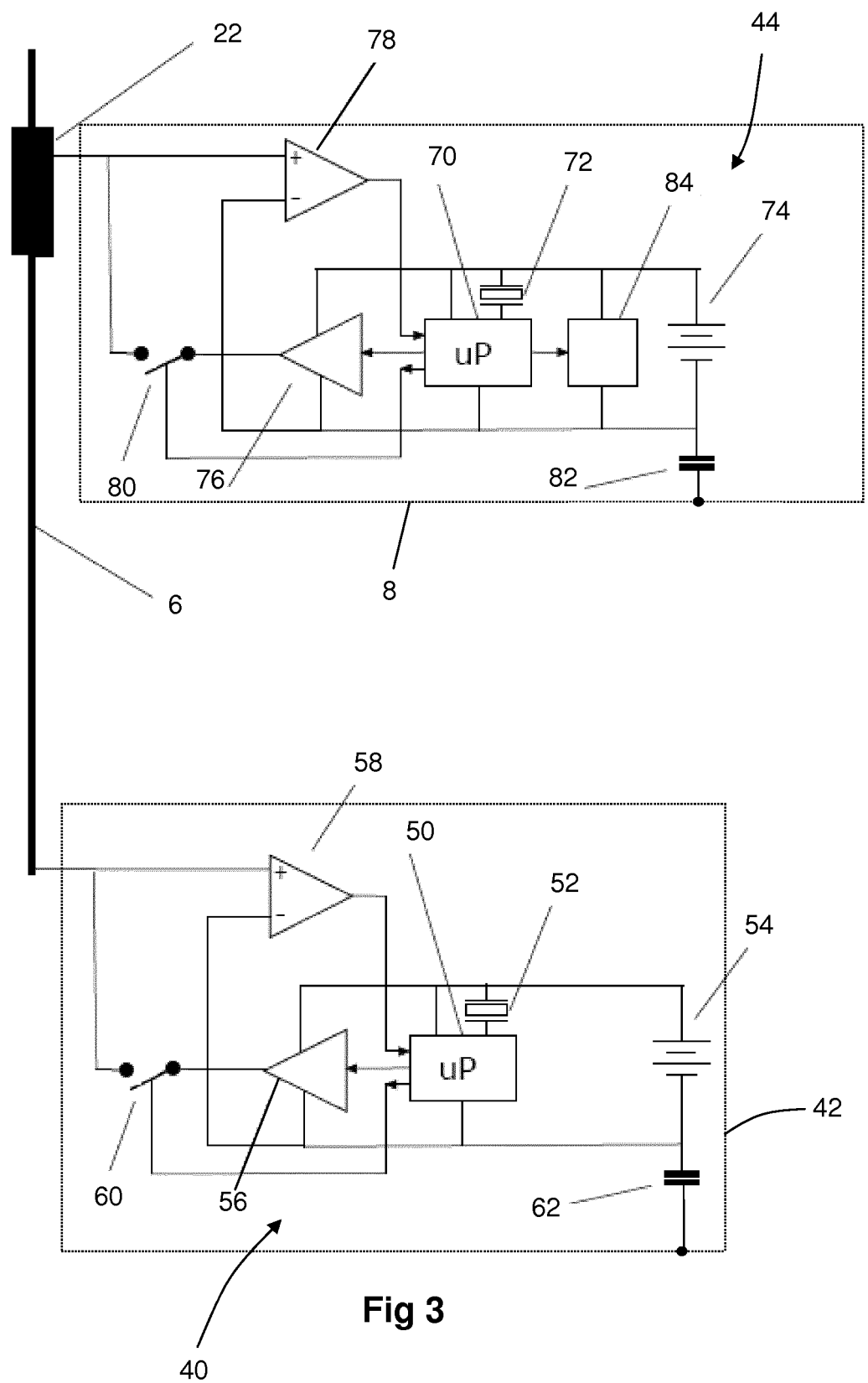
FIG. 3 shows surface transceiver electronics and downhole transceiver electronics of the first wellbore communication system of FIG. 1.

FIG. 3 illustrates the electrical connectivity between the downhole transceiver 40 and the surface transceiver which is generally designated 44. The slickline 6 provides an electrically conductive path between the sensing element 22 and the downhole transceiver 40. The downhole transceiver 40 is located within an enclosure 42 of the downhole tool 2. The surface transceiver 44 is located within the surface transceiver enclosure 8. As shown in FIG. 3, the sensing element 22 is electrically connected to the surface transceiver 44. The sensing element 22 is electrically insulated from the casing string 10, the stuffing box 14, the wellhead member 16 and the conductive core of the insulated slickline 6.

The electrically conductive arms 12 of the centraliser 11 shown in FIG. 1 are electrically connected to the enclosure 42 of the downhole tool 2. The enclosure 42 of the downhole tool 2 is capacitively coupled to the casing string 10 via the arms 12 and the contact head 13 of the centraliser 11. The magnitude of the capacitance between the enclosure 42 of the downhole tool 2 and the casing string 10 varies according to the material properties of the contact heads 13 and the casing string 10, the proximity of the contact head 13 to the casing string 10, and the nature or degree of any physical contact between the contact heads 13 and the casing string 10. Similarly, a capacitance exists between the surface transceiver enclosure 8 and the casing string 10 which depends on the nature of the electrical connections between the surface transceiver enclosure 8 and the casing string 10 via the stuffing box and the wellhead member 16. Although not shown explicitly in FIG. 3, it should be understood that as a consequence of the capacitive coupling between the enclosure 42 of the downhole tool 2 and the casing string 10 and the capacitive coupling between the surface receiver enclosure 8 and the casing string 10, an electrical return path is provided between the surface transceiver enclosure 8 and the enclosure 42 of the downhole tool 2 through the stuffing box 14, the wellhead member 16 and the casing string 10. Such an electrical return path may reduce noise and therefore permit improved communications between the downhole and surface transceivers 40, 44. For example, the electrical return path may permit communications between the downhole and surface transceivers 40, 44 at greater speeds and/or over greater distances.

The downhole transceiver 40 comprises a downhole processor in the form of a downhole microprocessor 50, a downhole timing crystal 52, a downhole power source in the form of a downhole battery 54, a downhole transmitter amplifier 56, a downhole receiver amplifier 58 and a downhole solid state switch 60. The downhole microprocessor 50 comprises a downhole transmitter which is capable of transmitting a signal to the downhole transmitter amplifier 56. Similarly, the downhole microprocessor 50 comprises a downhole receiver which is capable of receiving a signal from the downhole receiver amplifier 56. The downhole receiver amplifier 58 is a high gain amplifier circuit implemented in several stages with low pass and high pass RC network filters at the input and between the stages. The downhole receiver amplifier 58 comprises two programmable amplifiers which provide a total gain of up to 1000. Reference is made, for example, to Maxim Data Sheet 19-4329 Rev 2 12/10 "SPI Programmable-Gain Amplifier with input Vos Trim and Output Op Amp", which is incorporated herein by way of reference. The microprocessor 50 varies the programmable gain of the receiver amplifier 58 according to the magnitude of a signal received from the surface transceiver 44.

The downhole transceiver 40 is powered by the downhole battery 54. The downhole transceiver 40 further comprises a downhole capacitor 62 which connects the negative side of the downhole battery 54 to the enclosure 42 of the downhole tool 2. The downhole capacitor 62 and the variable capacitance between the enclosure 42 of the downhole tool 2 and the casing string 10 are connected in series between the negative side of the downhole battery 54 and the casing string 10. The downhole capacitor 62 is selected to have a value comparable to a minimum value of the variable capacitance between the enclosure 42 of the downhole tool 2 and the casing string 10. This results in a total capacitance between the negative, common or ground node of the surface receiver and the tubing which lies in an approximate range between 0.5 and 1 times the minimum value of the variable capacitance between the enclosure 42 of the downhole tool 2 and the casing string 10. In effect, the presence of the downhole capacitor 62 greatly reduces the variation in the total capacitance between the negative side of the downhole battery 54 and the casing string 10 and therefore also reduces the dynamic range of the signal received at the downhole receiver amplifier 58 from the surface transceiver 44. Consequently, the presence of the downhole capacitor 62 may reduce the variation of the programmable gain required at the downhole receiver amplifier 58.

Similarly, the surface transceiver 44 comprises a surface processor in the form of a surface microprocessor 70, a surface timing crystal 72, a surface power source in the form of a surface battery 74, a surface transmitter amplifier 76, a surface receiver amplifier 78 and a surface solid state switch 80. The surface microprocessor 70 comprises a surface transmitter which is capable of transmitting a signal to the surface transmitter amplifier 76. Similarly, the surface microprocessor 70 comprises a surface receiver which is capable of receiving a signal from the surface receiver amplifier 76. The surface receiver amplifier 78 is a high gain amplifier circuit implemented in several stages with low pass and high pass RC network filters at the input and between the stages. The surface receiver amplifier 78 comprises two programmable amplifiers which provide a total gain of up to 1000.

The surface transceiver 44 is powered by the surface battery 74. The surface transceiver 44 further comprises a surface capacitor 82 which connects the negative side of the surface battery 74 to the surface transceiver enclosure 8. The surface capacitor 82 and the capacitance between the surface transceiver enclosure 8 and the casing string 10 are connected in series between the negative side of the surface battery 74 and the casing string 10. The surface capacitor 82 is selected to have a value comparable to a minimum value of the capacitance between the surface transceiver enclosure 8 and the casing string 10. In effect, the presence of the surface capacitor 82 greatly reduces the total capacitance between the negative side of the surface battery 74 and the casing string 10 and therefore also the dynamic range of the signal received at the surface receiver amplifier 78 from the downhole transceiver 40. Consequently, the presence of the surface capacitor 82 may reduce the variation of the programmable gain required at the surface receiver amplifier 78.

In addition, the surface transceiver 44 comprises a wireless transceiver in the form of a radio module 84 which is configured for communication with the microprocessor 70 and for wireless communication with a remote user interface such as a remote computer (not shown) which is configured to store data received from the radio module 84 and/or to display the data to a user. The remote user interface may, for example, be configured to display the received data to the user in real time and/or may be configured to process the received data and present the user with information derived from the received data.

In use, as explained in more detail below, when it is desired to transmit a signal from the downhole transceiver 40 to the surface transceiver 44, the downhole microprocessor 50 closes the downhole switch 60 (if switch 60 is not already closed), the surface microprocessor 70 opens the surface switch 80 (if switch 80 is not already opened) and the downhole microprocessor 50 transmits a signal to the surface microprocessor 70 via the downhole transmitter amplifier 56, the downhole switch 60, the slickline 6, the sensing element 22 and the surface receiver amplifier 78. The surface microprocessor 70 may then communicate data representative of the received signal to the remote user interface (not shown) via the radio module 84.

Conversely, when it is desired to transmit a signal from the surface transceiver 44 to the downhole transceiver 40, the surface microprocessor 70 closes the surface switch 80 (if switch 80 is not already closed), the downhole microprocessor 50 opens the downhole switch 60 (if switch 60 is not already opened) and the surface microprocessor 70 transmits a signal to the downhole microprocessor 50 via the surface transmitter amplifier 76, the surface switch 80, the sensing element 22, the slickline 6 and the downhole receiver amplifier 58.

In more detail, the downhole transceiver 40 communicates with the surface transceiver 44 by first sending a message, then listening for a response, according to the following method. Each timing crystal 52, 72 provides a timing signal to the corresponding microprocessor 50, 70 which uses the timing signal to derive a data clock frequency. The microprocessors 50, 70 employ FSK signalling using a sinusoidal or square wave carrier frequency in the range 2 kHz to 15 kHz. An encoding scheme such as Manchester Data encoding is used as a modulation scheme. This scheme avoids long strings of "ones" or "zeros" and has the encoding clock embedded in it. Reference is made for example to Maxim Application note 3435 "Manchester Data Encoding for Radio Communications, Jan. 26, 2005, which is incorporated herein by way of reference. A typical data rate is 300 baud (up and down).

The downhole microprocessor 50 receives digital information such as production logging data from the downhole tool 2 by well known means. This data is assembled into a data packet, with error detection data, such as a checksum. The downhole microprocessor 50 closes the downhole switch 60 and transmits the data onto slickline 6 via downhole amplifier 56. The data is received by the surface microprocessor 70 via tubular sensing element 22 and the programmable gain surface receiver amplifier 78. The surface microprocessor 70 decodes the data and transmits data in an appropriate format to the remote computer (not shown) via the low power radio module 84.

Once the downhole microprocessor 50 has finished sending the data packet, it opens downhole switch 60, removing the output impedance of downhole transmitter amplifier 56 from the line. The downhole microprocessor 50 now listens for a data packet coming from the surface transceiver 44 via insulated slickline 6. The encoding scheme and frequency used by the surface transceiver 44 is identical to the one used by the downhole transceiver 40. The amplified signal from the downhole receiver amplifier 58 is digitised by the downhole microprocessor 50 and digitally filtered using well known means. A suitable digital filter algorithm is the sliding Goertzel filter. Reference is made for example to "Streamlining digital signal processing: a tricks of the trade guidebook" Chapter 14, Richard G. Lyons, which is incorporated herein by way of reference. Once the downhole microprocessor 50 has decoded the incoming data packet it then acts on the command from the surface. Typical commands depend on the downhole tool 2 connected to the downhole transceiver 40, but for a production logging string, the sample rate of the tool may be selected, or the tool may be switched on or off, to save battery power.

It is important for effective decoding and filtering that the downhole transceiver 40 and the surface transceiver 44 have very accurately matched encoding/decoding frequencies. However, the temperature downhole can be considerably higher than surface temperatures, and this causes the frequency of the downhole crystal 52 to change with respect to the frequency of the surface crystal 72. To compensate for this, the surface microprocessor 70 precisely measures the frequency of the data received from the downhole microprocessor 50 using a first precision counter/timer module within the surface microprocessor 70. The data transmission frequency of the surface microprocessor 70 is generated by a second counter/timer module within the surface microprocessor 70 which is digitally adjusted to so that the frequency of data transmitted by the surface microprocessor 70 exactly matches the frequency of data received by the surface microprocessor 70. This enables the downhole microprocessor 50 to decode the data received from the surface microprocessor 70 without itself having to take any measures to compensate for frequency drift induced by downhole temperature changes. This reduces the complexity of the downhole electronics.

Figure 4:
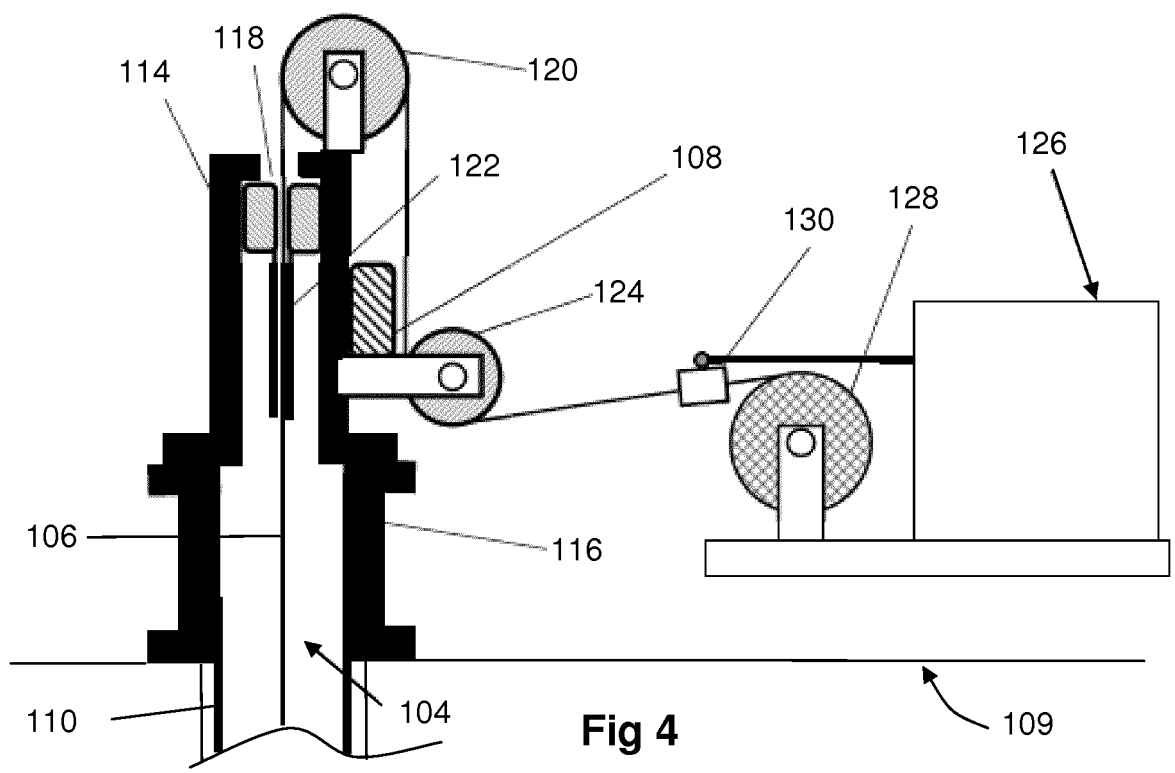
FIG. 4 shows a part of a second wellbore communication system.

FIG. 4 illustrates a part of a second wellbore communication system in a wellhead region at or adjacent a surface 109. The second wellbore communication system shares many like features with the first wellbore communication system 1 of FIGS. 1-3 and, as such, like features share like reference numerals. Like the first wellbore communication system 1 of FIGS. 1-3, the second wellbore communication system comprises an insulated slickline 106 and a surface transceiver (not shown in FIG. 4) located within a surface transceiver enclosure 108 above or adjacent the surface 109. In use, the insulated slickline 106 conveys signals between a downhole transceiver within a downhole tool in a wellbore 104 and the surface transceiver within the surface transceiver enclosure 108. The slickline 106 also supports the downhole tool within the wellbore 104. An electrically conductive casing string 110 is installed within the wellbore 104. A stuffing box 114 is mounted on a wellhead member 116 located at or adjacent surface 109. The stuffing box 114 comprises flow tubes 118 which fit closely around the insulated slickline 106 and serve to form a pressure seal to prevent the escape of well fluids from the wellbore 104.

The second wellbore communication system further comprises an elongate tubular sensing element 122 which is capacitively coupled to the insulated slickline 106. The sensing element 122 extends around the insulated slickline 106 whilst allowing the slickline 106 to run freely therethrough. The second wellbore communication system differs from the first wellbore communication system 1 in that the sensing element 122 of the second wellbore communication system is mounted within the stuffing box 114 at a position below the flow tubes 118. The sensing element 122 is electrically insulated from the flow tubes 118. The insulated slickline 106 runs through the elongate tubular sensing element 122, through the flow tubes 118 and over an upper sheave wheel 120 before running round a lower sheave wheel 124 on the way to a slickline unit generally designated 126. The slickline unit 126 includes a motor driven cable drum 128 for spooling the insulated slickline 106 for raising and/or lowering a downhole tool within a wellbore 104. The slickline unit 126 also includes a steerable arm 130 for controlling spooling of the slickline 106 onto the drum 128.

The surface transceiver enclosure 108 is mounted on the stuffing box 114. The tubular sensing element 122 and the surface transceiver located within the surface transceiver enclosure 108 are configured for communication. For example, the tubular sensing element 122 and the surface transceiver located within the surface transceiver enclosure 108 may be configured for wireline or wireless communication. One skilled in the art will appreciate that the operation of the second wellbore communication system closely resembles the operation of the first wellbore communication system 1.

Figure 5:
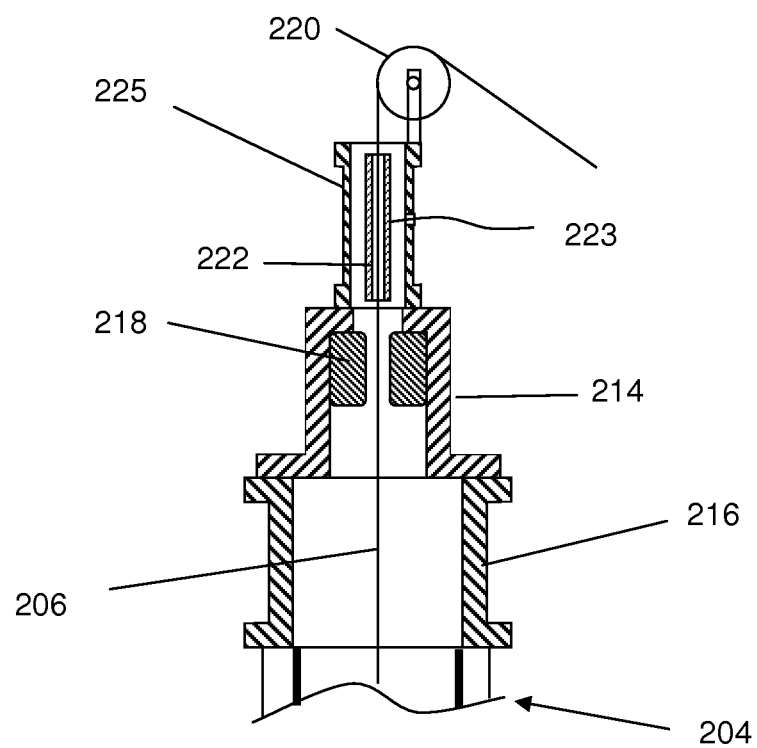
FIG. 5 shows a part of a third wellbore communication system.

FIG. 5 illustrates a part of a third wellbore communication system in a wellhead region. The third wellbore communication system shares many like features with the first and second wellbore communication systems of FIGS. 1-4 and, as such, like features share like reference numerals. Like the first and second wellbore communication systems, the third wellbore communication system comprises an insulated slickline 206, an elongate tubular sensing element 222, and a surface transceiver (not shown in FIG. 5). The sensing element 222 is capacitively coupled to the slickline 206 and is connected to the surface transceiver via an electrical conductor 223. A stuffing box 214 is mounted on a wellhead member 216. The stuffing box 214 comprises flow tubes 218 which fit closely around the insulated slickline 206 and serve to form a pressure seal to prevent the escape of well fluids from a wellbore 204. The third wellbore communication system differs from the first and second wellbore communication systems in that the sensing element 222 is mounted within a tubular housing 225 mounted above the stuffing box 214. The insulated slickline 206 runs through the sensing element 222, and over an upper sheave wheel 220 on the way to a slickline unit (not shown). One skilled in the art will appreciate that the operation of the third wellbore communication system closely resembles the operation of the first and second wellbore communication systems of FIGS. 1-4.

Figure 6:
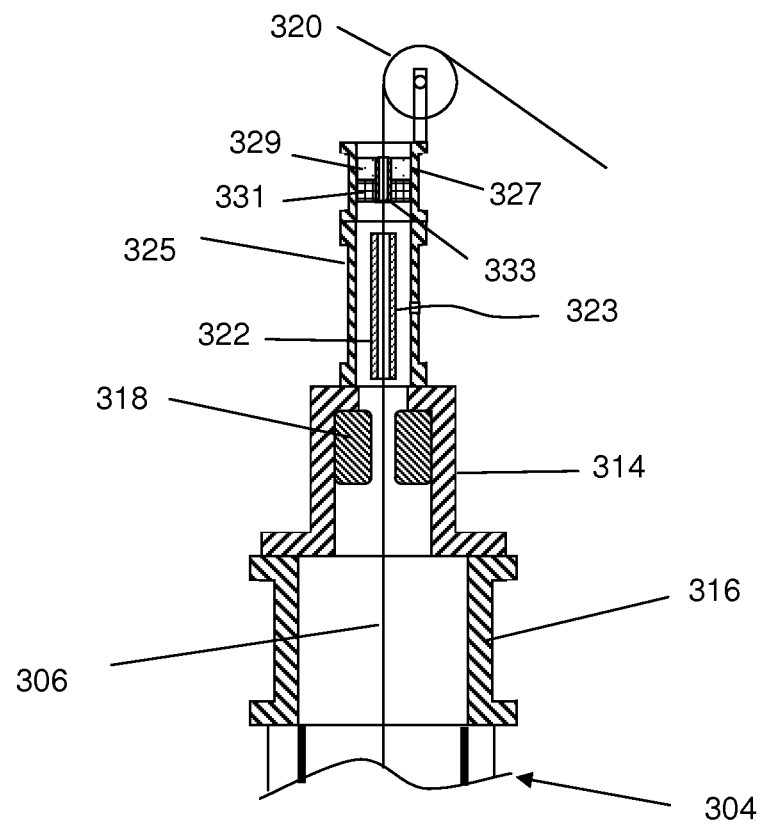
FIG. 6 shows a part of a fourth wellbore communication system.

FIG. 6 illustrates a part of a fourth wellbore communication system in a wellhead region. The fourth wellbore communication system shares many like features with the third wellbore communication system of FIG. 5 and, as such, like features share like reference numerals. Like the third wellbore communication system, the fourth wellbore communication system comprises an insulated slickline 306, an elongate tubular sensing element 322, and a surface transceiver (not shown in FIG. 6). The sensing element 322 is capacitively coupled to the slickline 306 and is connected to the surface transceiver via an electrical conductor 323. A stuffing box 314 is mounted on a wellhead member 316. The stuffing box 314 comprises flow tubes 318 which fit closely around the insulated slickline 306 and serve to form a pressure seal to prevent the escape of well fluids from a wellbore 304. Like the third wellbore communication system, the sensing element 322 is mounted within a tubular housing 325 mounted above the stuffing box 314. The sensing element 322 extends around the insulated slickline 306 whilst allowing the slickline 306 to run freely therethrough. The insulated slickline 306 runs through the elongate tubular sensing element 322, and over an upper sheave wheel 320 on the way to a slickline unit (not shown). The fourth wellbore communication system of FIG. 6 differs from the third wellbore communication system of FIG. 5, in that the fourth wellbore communication system comprises a further tubular housing 327 mounted above the tubular housing 325. The fourth wellbore communication system further comprises a toroid 329 and a ferrite ring 331 surrounding an insulating sleeve 333 located around the slickline 306 within the further tubular housing 327. In use, the toroid 329 and the ferrite ring 331 serve as electrical filters to at least suppress electrical noise coupled onto the slickline 306. In a variant of the fourth wellbore communication system of FIG. 6, the fourth wellbore communication system may comprise a further toroid (not shown) mounted adjacent the toroid 329 surrounding the sleeve 333. In such a variant, the toroid 329 may be used to sense electrical noise carried by the conductive core of the slickline 306 and the further toroid may be used to apply an electrical signal to the conductive core of the slickline 306 for cancellation of the electrical noise. The toroid 329 may, in particular, be used to sense 50 Hz electrical noise carried by the conductive core of the slickline 306, and the further toroid may be used to apply a 50 Hz electrical signal to the conductive core of the slickline 306 for cancellation of the 50 Hz electrical noise. One skilled in the art will appreciate that in other respects the operation of the fourth wellbore communication system closely resembles the operation of the first and second wellbore communication systems of FIGS. 1-4.

Figure 7:
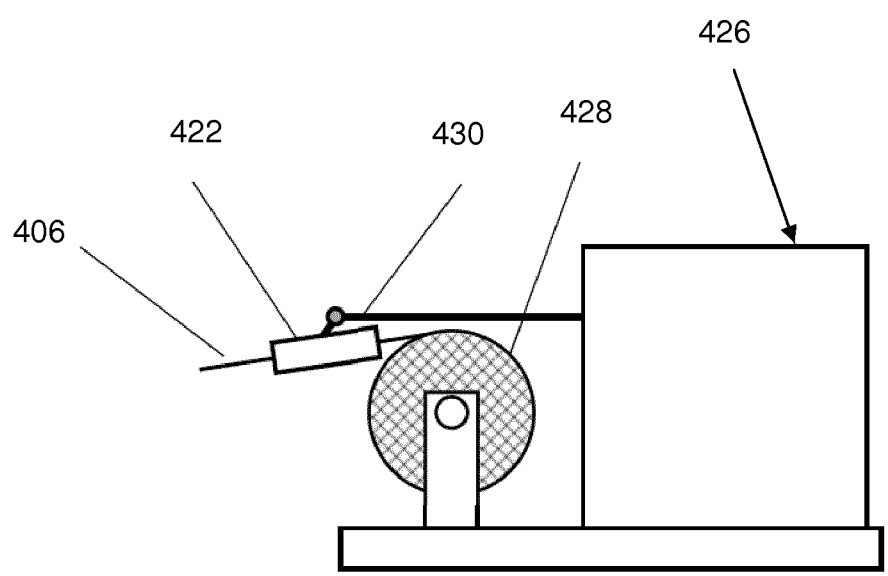
FIG. 7 shows a part of a fifth wellbore communication system.

FIG. 7 illustrates a slickline unit 426 of a fifth wellbore communication system. The fifth wellbore communication system shares many like features with the first to fourth wellbore communication systems of FIGS. 1-6 and, as such, like features share like reference numerals. The slickline unit 426 includes a motor driven cable drum 428 for spooling an insulated slickline 406 for raising and/or lowering a downhole tool within a wellbore (not shown). The slickline unit 426 also includes a steerable arm 430 for controlling spooling of the slickline 406 onto the drum 428. The fifth wellbore communication system differs from the first to fourth wellbore communication systems shown in FIGS. 1-6, in that the fifth wellbore communication system comprises a tubular sensing element 422 which is designed into the steerable arm 430 and electrically insulated from the associated metalwork of the steerable arm 430.

Figure 8:
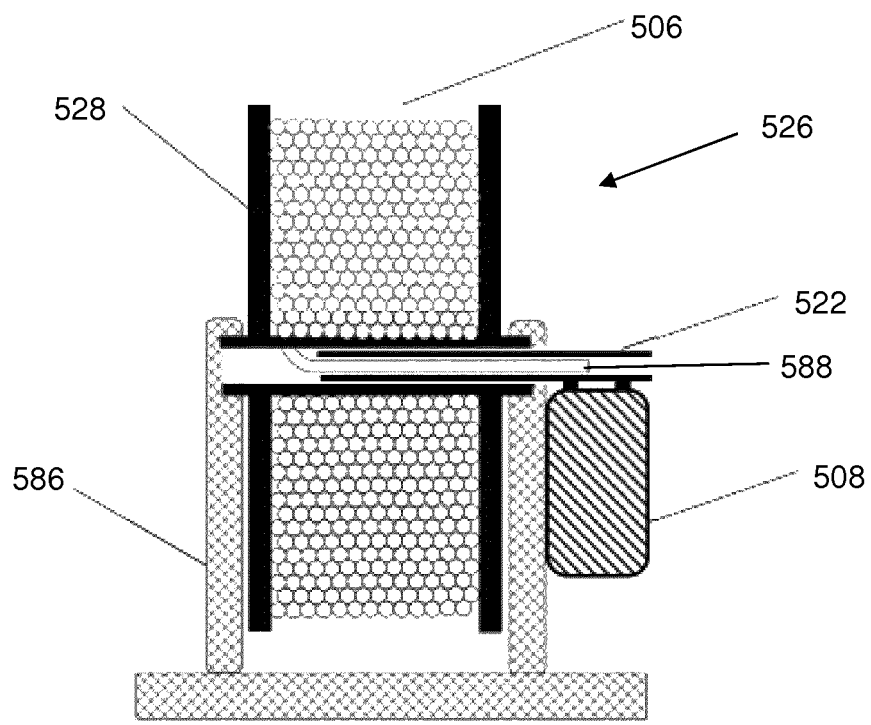
FIG. 8 is a schematic cross-section of a part of a sixth wellbore communication system.

FIG. 8 illustrates a cross-section through a motor driven cable drum 528 of a slickline unit 526 of a sixth wellbore communication system. The sixth wellbore communication system shares many like features with the first to fifth wellbore communication systems of FIGS. 1-7 and, as such, like features share like reference numerals. The motor driven cable drum 528 is configured for spooling an insulated slickline 506 for raising and/or lowering a downhole tool within a wellbore (not shown). Like the first to fifth wellbore communication systems, the sixth wellbore communication system comprises a tubular sensing element 522 which is capacitively coupled to the insulated slickline 506. However, the sixth wellbore communication system differs from the first to fifth wellbore communication systems, in that the tubular sensing element 522 is located inside the drum 528 along an axis of rotation of the drum 528. The tubular sensing element 522 is physically attached to, but electrically insulated from, a chassis 586 of the slickline unit 526 which supports the drum 528. An upper end 588 of the slickline 506 extends into, and rotates with, the drum 528 relative to the tubular sensing element 522. The sixth wellbore communication system further comprises a surface transceiver enclosure 508 which is attached to the chassis 586. The tubular sensing element 522 is electrically insulated from the surface transceiver enclosure 508 but is configured for communication with a surface transceiver (not shown) located within the surface transceiver enclosure 508.

Figure 9:
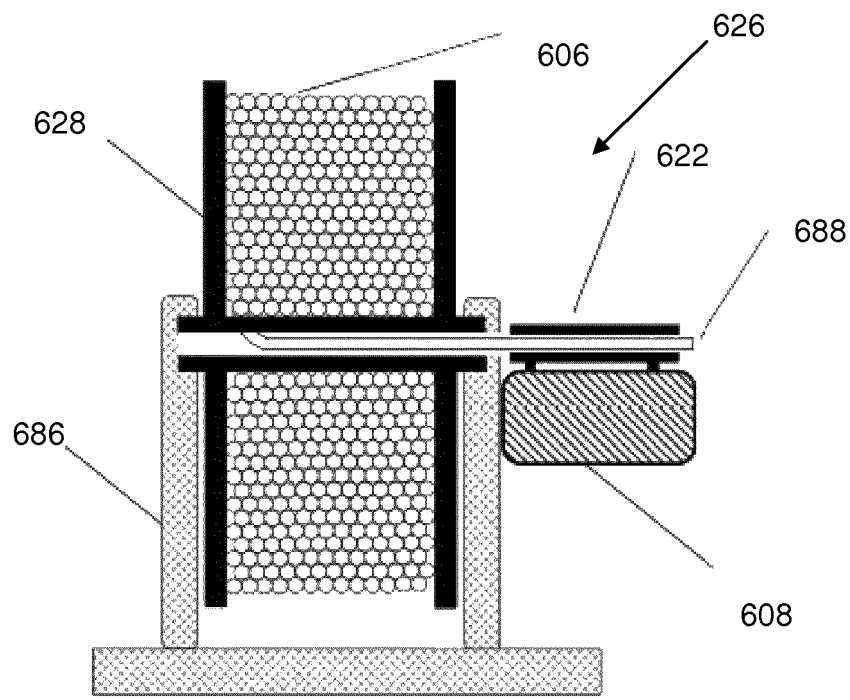
FIG. 9 is a schematic cross-section of a part of a seventh wellbore communication system.

FIG. 9 illustrates a cross-section through a motor driven cable drum 628 of a slickline unit 626 of a seventh wellbore communication system. The seventh wellbore communication system shares many like features with the sixth wellbore communication system of FIG. 8 and, as such, like features share like reference numerals. The motor driven cable drum 628 is configured for spooling an insulated slickline 606 for raising and/or lowering a downhole tool within a wellbore (not shown). Like the sixth wellbore communication system of FIG. 8, the seventh wellbore communication system of FIG. 9 comprises a tubular sensing element 622 which is located along an axis of rotation of the drum 628. The tubular sensing element 622 of the seventh wellbore communication system is physically attached to, but electrically insulated from, a chassis 686 of the slickline unit 626 which supports the drum 628. An upper end 688 of the slickline 606 extends into, and rotates with, the drum 628 relative to the tubular sensing element 622. The seventh wellbore communication system further comprises a surface transceiver enclosure 608 which is attached to the chassis 686. The tubular sensing element 622 is electrically insulated from the surface transceiver enclosure 608 but is configured for communication with a surface transceiver (not shown) located within the surface transceiver enclosure 608. However, the seventh wellbore communication system differs from the sixth wellbore communication system in that the tubular sensing element 622 is located to one side of the drum 628.

Figure 10:
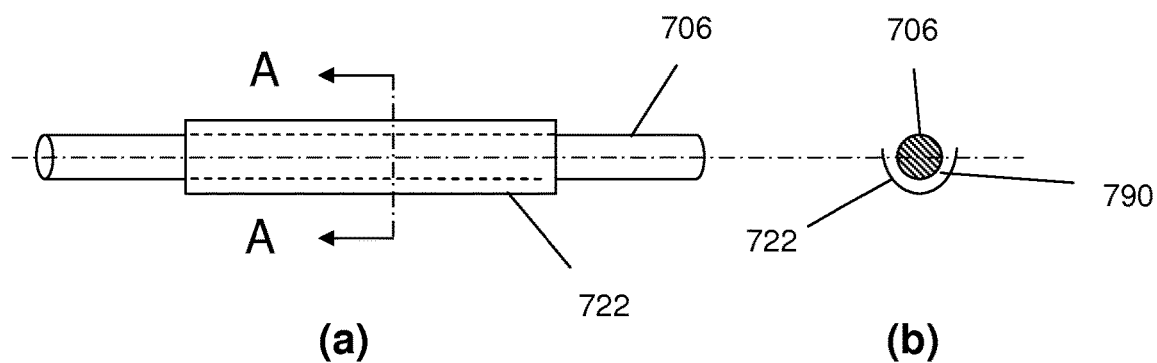
FIG. 10(a) is a side elevation of a sensing element and a slickline located adjacent the sensing element.
FIG. 10(b) shows a cross-section on AA of the sensing element and the slickline of FIG. 10(a)

Referring to FIGS. 10(a) and 10(b) there is shown an electrically conductive sensing element 722 which defines a U-shaped channel 790 which is configured to accommodate a slickline 706. The sensing element 722 is configured to extend adjacent to the slickline 706 and the U-shaped channel 790 is configured to be complementary in shape to an outer surface of the slickline 706 so as to enhance a capacitive coupling efficiency between the slickline 706 and the sensing element 722. It should be understood that the sensing element 722 may replace any of the tubular sensing elements 22, 122, 222, 322, 422, 522 and 622 in any of the foregoing wellbore communication systems.

Figure 11:
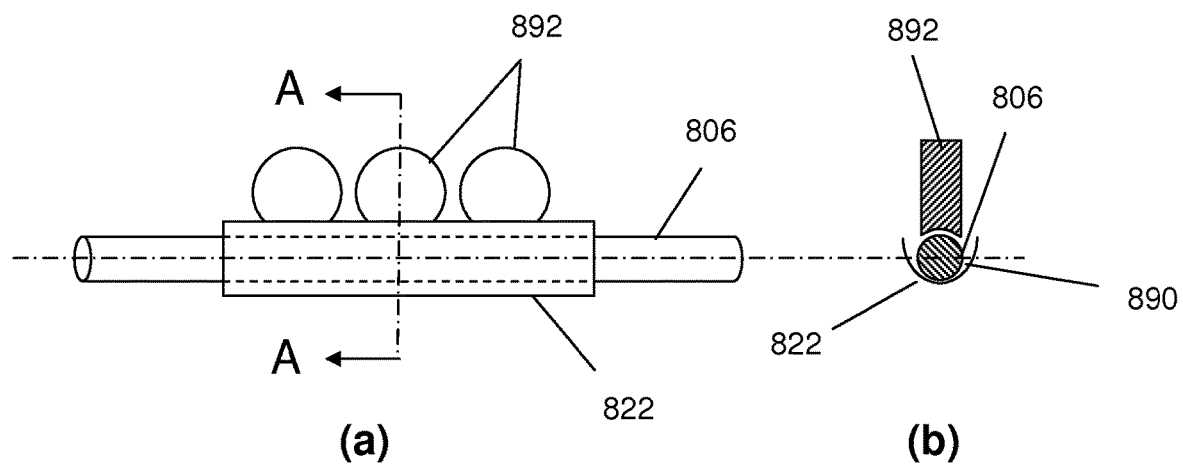
FIG. 11(a) shows a side elevation of a sensing element and a slickline located adjacent the sensing element.
FIG. 11(b) shows a cross-section on AA of the sensing element and the slickline of FIG. 11(a)

Referring to FIGS. 11(a) and 11(b) there is shown a sensing element arrangement comprising a sensing element 822 which defines a U-shaped channel 890 which is configured to accommodate a slickline 806. The sensing element arrangement further comprises rollers 892. In use, the rollers 892 serve to maintain the slickline 806 in close proximity to the sensing element 822 for enhanced coupling of an electric field therebetween. The rollers 892 may be biased so as to urge the slickline 806 into engagement with the U-shaped channel 890. It should be understood that the sensing element 822 may replace any of the tubular sensing elements 22, 122, 222, 322, 422, 522 and 622 in any of the wellbore communication systems corresponding to FIGS. 1-9.

Figure 12:
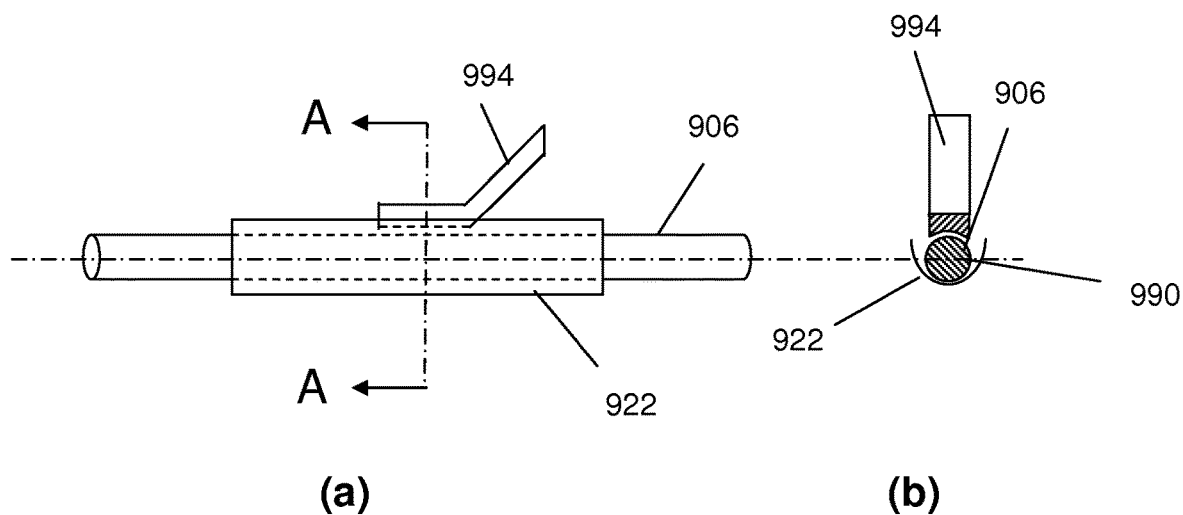
FIG. 12(a) shows a side elevation of a sensing element and a slickline located adjacent the sensing element.
FIG. 12(b) shows a cross-section on AA of the sensing element and the slickline of FIG. 12(a)

Referring to FIGS. 12(a) and 12(b) there is shown a sensing element arrangement comprising a sensing element 922 and a spring element 994 which is configured to bias a slickline 906 into engagement with a U-shaped channel 990 defined by the sensing element 922. It should be understood that the sensing element 922 may replace any of the tubular sensing elements 22, 122, 222, 322, 422, 522 and 622 in any of the wellbore communication systems corresponding to FIGS. 1-9.

Figure 13:
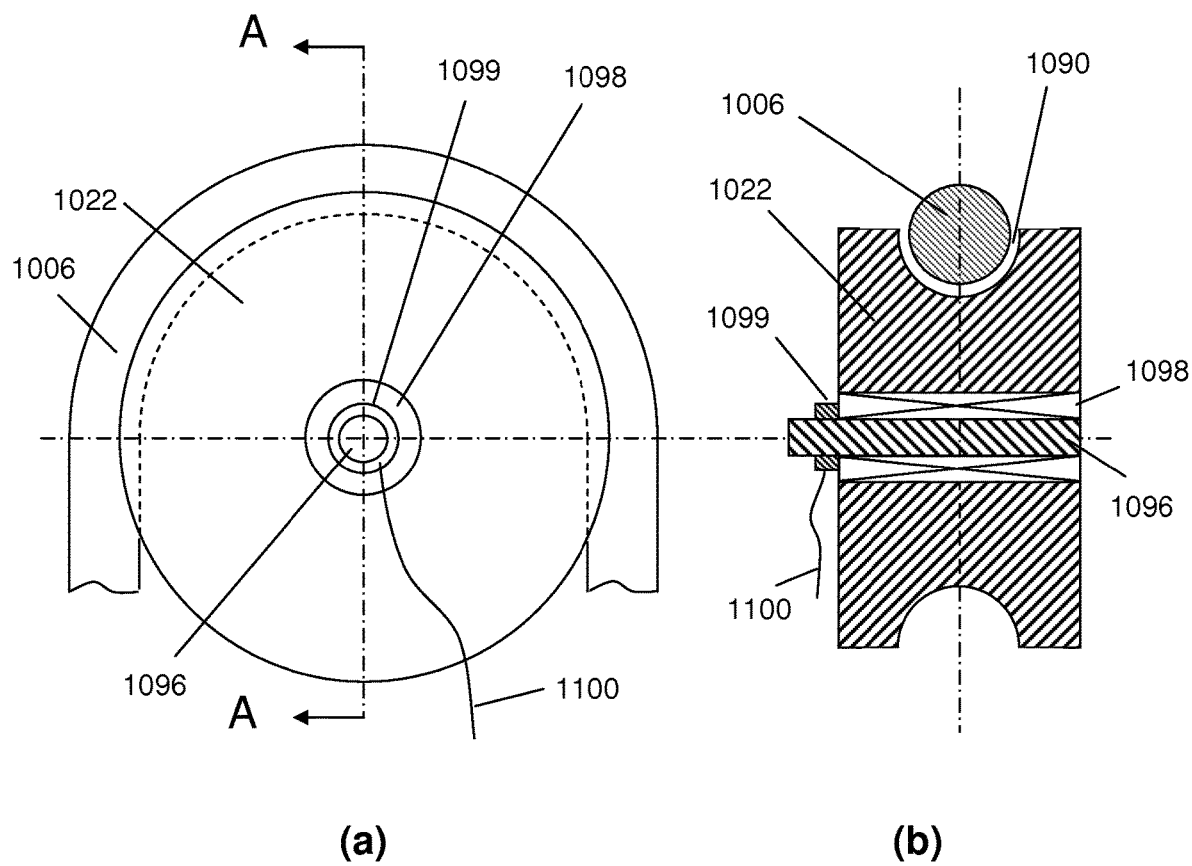
FIG. 13(a) shows a side elevation of a sheave sensing element and a slickline extending round the sheave.
FIG. 13(b) is a schematic cross-section on AA of the sheave sensing element and the slickline of FIG. 13(a).

FIGS. 13(a) and 13(b) a sensing element arrangement comprising a sheave sensing element 1022 having a slickline 1006 extending round the sheave sensing element 1022. The sheave sensing element 1022 defines a U-shaped channel 1090 on an outer surface thereof which is configured to accommodate the slickline 1006. The U-shaped channel 1090 is configured to be complementary in shape to an outer surface of the slickline 1006 so as to enhance a capacitive coupling efficiency between the slickline 1006 and the sheave sensing element 1022. The sheave sensing element 1022 is metallic and is attached to a metallic axle 1096 for rotation in a bearing arrangement 1098 supported by a chassis (not shown). The sheave sensing element arrangement further comprises a mercury wetted slip ring 1099 and an electrical conductor 1100. The electrical conductor 1100 is connected to a surface receiver (not shown). The mercury wetted slip ring 1099 provides an electrical connection between the sheave sensing element 1022 and the electrical conductor 1100 via the axle 1096. In use, transmission of an electrical signal along the slickline 1006 from a downhole tool induces a voltage signal in the sheave sensing element 1022 which is received and detected by the surface receiver for transmission of information from a downhole tool to the surface receiver. It should be understood that the sheave sensing element 1022 may be used as an alternative to any of the sensing elements 22, 122, 222, 322, 422, 522, and 622 in any of the wellbore communication systems corresponding to FIGS. 1-9. The sheave sensing element 1022 may be located anywhere between a stuffing box at a wellhead (not shown) and an upper end (not shown) of the slickline 1006. For example, the sheave sensing element 1022 may be located anywhere between the stuffing box 14 and an upper end of the slickline 6 of the wellbore communication system 1 shown in FIG. 1. In particular, the sheave sensing element 1022 may replace sheave 20 or 24 in FIG. 1.

It should be understood that the wellbore communication systems described herein are merely exemplary and that various modifications may be made thereto without departing from the scope of the invention. For example, the downhole transceiver may be attached to one or more of a range of well known electric wireline tools strings, such as a string of wireline production logging tools, a wireline conveyed perforating gun system, a casing collar locator, a natural gamma ray depth correlation tool, a motorised wireline calliper tool, a motorised wireline centralisers or any other well known electric wireline or conventional slickline tool.

With reference to the wellbore communication system 1 of FIGS. 1-3, an electrical conductor may connect the surface transceiver enclosure 8 to the casing string 10 so as to provide a portion of the electrical return path between the surface transceiver enclosure 8 and the enclosure 42 of the downhole tool 2 through the casing string 10.

What is claimed is:
1. A wellbore communication system comprising:
a downhole tool having a downhole transmitter;
a surface receiver for location at a surface;
an insulated slickline having an electrically conductive core surrounded by an insulated coating;
an elongated tubular sensing element connected electrically to the surface receiver, the elongated tubular sensing element defining an elongated channel for the insulated slickline, the elongated channel having a length which is greater than a diameter of the insulated slickline;
a wellhead housing or a stuffing box for forming a pressure seal around the slicklne;
wherein the sensing element is located within the wellhead housing or stuffing box, and,
wherein the slickline is attached to the downhole tool and connected electrically to the downhole transmitter, wherein the slickline extends through the elongated channel of the sensing element, and wherein the sensing element and the slickline are capacitively coupled so as to permit relative movement therebetween and so as to permit an electric field to extend from the core of the slickline to the sensing element through the insulating coating of the slickline for transmission of information from the downhole transmitter to the surface receiver via the slickline and the sensing element.

2. A wellbore communication system according to claim 1, wherein the sensing element may be is at least partially electrically conductive.

3. A wellbore communication system according to claim 1, wherein the sensing element defines a surface profile which is substantially complementary to and disposed towards an outer surface of the slickline.

4. A wellbore communication system according to claim 1, wherein the sensing element defines a generally concave surface profile which is disposed towards an outer surface of the slickline.

5. A wellbore communication system according to claim 1, wherein the sensing element at least partially surrounds the slickline.

6. A wellbore communication system according to claim 1, wherein at least one of the sensing element and the slickline comprises a wear-resistant outer surface region and/or a wear-resistant coating.

7. A wellbore communication system according to claim 1, wherein the sensing element is separated from the insulating coating of the slickline by a gap.

8. A wellbore communication system according to claim 1, wherein the sensing element engages the insulating coating of the slickline.

9. A wellbore communication system according to claim 8, wherein the system is configured to urge the slickline into engagement with the sensing element.

10. A wellbore communication system according to claim 1, comprising electrically conductive tubing inserted into a bore hole.

11. A wellbore communication system according to claim 10, comprising a downhole enclosure for housing the downhole transmitter, wherein the downhole enclosure is capacitively coupled to the tubing.

12. A wellbore communication system according to claim 11, wherein the downhole enclosure is coupled to the tubing via a centraliser arrangement.

13. A wellbore communication system according to claim 10, comprising a surface enclosure for housing the surface receiver, wherein the surface enclosure is capacitively coupled to the tubing.

14. A wellbore communication system according to claim 13, comprising a capacitor connected between a negative, common or ground node of the surface receiver and the surface enclosure.

15. A wellbore communication system according to claim 13, wherein the surface enclosure is coupled to the tubing via a return conductor.

16. A wellbore communication system according to claim 1, wherein the sensing element is elongated in a direction along which the slickline extends.

17. A wellbore communication system according to claim 1, wherein the sensing element comprises two parts which are separable to permit insertion of the slickline therebetween.

18. A wellbore communication system according to claim 1, comprising a toroid positioned around the slickline.

19. A wellbore communication system according to claim 18, comprising a further toroid positioned around the slickline adjacent to the toroid, wherein the toroid is configured to sense an electrical noise carried by the conductive core of the slickline and the further toroid is configured to apply an electrical signal to the conductive core of the slickline for cancellation of the electrical noise.

20. A wellbore communication system accoring to claim 19, wherein the further toroid is positioned between the sensing element and an upper end of the stickline.

21. A wellbore communication system according to claim 18, wherein the toroid is positioned between the sensing element and an upper end of the slickline.

22. A wellbore communication system according to claim 1, comprising one or more ferrite rings positioned around the slickline.

23. A wellbore communciation system according to claim 22, wherein the one or more ferrite rings are positioned between the sensing element and an upper end of the stickline.

24. A wellbore communication system according to claim 1, wherein the stuffing box comprises flow tubes for forming the pressure seal around the slickline.

25. A wellbore communication system according to claim 24, wherein the sensing element is located within the flow tubes or at a position below the flow tubes.

26. A wellbore communication system according to claim 1, wherein the sensing element is split longitudinally along a direction of the slickline.

27. A wellbore communication system according to claim 1, comprising a downhole receiver coupled to the insulated slickline and a surface transmitter coupled to the sensing element for transmission of information from the surface transmitted to the downhole receiver via the sensing element and the slickline.

28. A wellbore communication system according to claim 27, comprising a surface processor, wherein the surface processor is configured to determine a frequency of data received by the surface receiver from the downhole transmitter and to control the surface transmitter so as to transmit data to the downhole receiver at the determined data frequency.

29. A wellbore communication system according to claim 27, wherein the downhole receiver is housed within a downhole enclosure and the wellbore communication system comprises a capacitor connected between a negative, common or ground node of the downhole receiver and the downhole enclosure.

30. A wellbore communication system comprising:
a downhole tool having a downhole transmitter;
a surface receiver for location at a surface;
a tubular sensing element connected electrically to the surface receiver;
an insulated slickline having an electrically conductive core surrounded by an insulating coating;
a wellhead housing or a stuffing box for forming a pressure seal around the slicklne;
wherein the sensing element is located within the wellhead housing or stuffing box,
wherein the slickline is attached to the downhole tool and connected electrically to the downhole transmitter, wherein the slickline extends through the sensing element, and
wherein the sensing element and the slickline are capacitively coupled so as to permit relative movement therebetween and so as to permit an electric field to extend from the core of the slickline to the sensing element through the insulating coating of the slickline for transmission of information from the downhole transmitter to the surface receiver via the slickline and the sensing element; and
wherein the sensing element is split longitudinally along a direction of the slickline.

* * * * *